Nov. 5, 1940.  P. M. KNUDSEN  2,220,820
HEADLIGHT SIGNAL
Filed Sept. 7, 1939
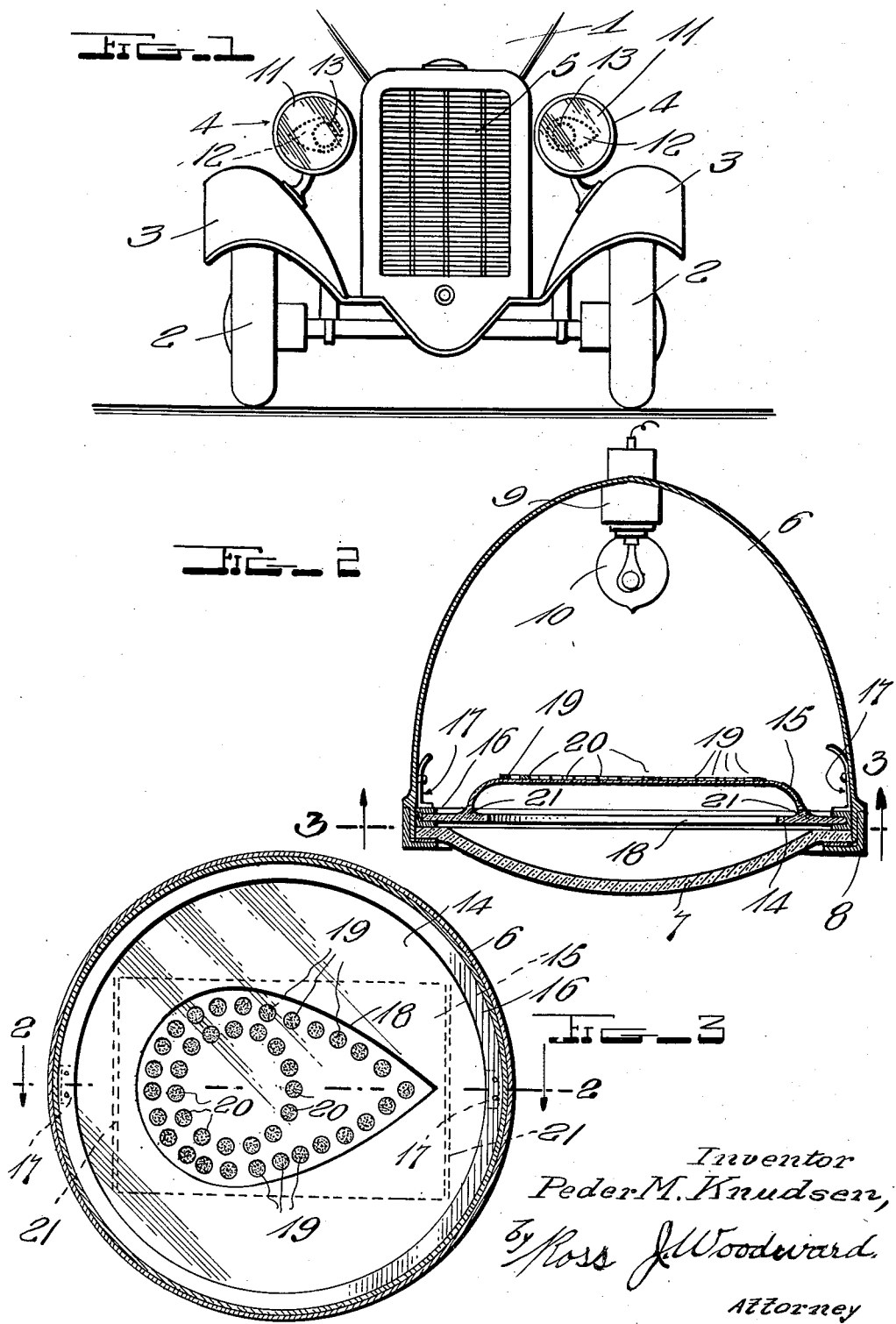
Inventor
Peder M. Knudsen,
by Ross J. Woodward
Attorney Patented Nov. 5, 1940

2,220,820

UNITED STATES PATENT OFFICE 2,220,820

HEADLIGHT SIGNAL

Peder M. Knudsen, Katonah, N. Y.

Application September 7, 1939, Serial No. 293,857

2 Claims. (Cl. 177—329)

This invention relates to headlights for automobiles or other motor vehicles and relates more particularly to an attachment adapted to be mounted in a headlight of conventional construction for indicating to the driver of an approaching vehicle which headlight is extinguished when the bulb of one headlight is not burning.

All automobiles have two headlights mounted respectively at the right and left sides of the radiator for illuminating the roadway and also serving as a guide for the driver of an approaching vehicle. If the bulb of one headlight is out it is difficult for the driver of the approaching vehicle to determine whether he is approaching a motor cycle or an automobile having only one light in operation and even if he is able to determine that he is approaching an automobile having only one headlight in operation, it is often difficult to determine which headlight is extinguished. Therefore, head-on collisions are liable to occur and it is one object of the present invention to provide the headlights of an automobile with an attachment which will cause the headlights, when illuminated to present the appearance of a pair of eyes, one being the right eye and the other the left eye. It will thus be seen that when one headlight is not lighted, the driver of an approaching automobile will only see one eye and can pass safely, as he will know whether the right or left headlight is extinguished, it being obvious that he will also know that he is approaching an automobile or truck as a motorcycle has but one headlight and would not be equipped with a signal device constituting a representation of an eye.

Another object of the invention is to so form the signaling device that when it is applied to a headlight it may be adjusted to represent either a left eye or a right eye, thus making it unnecessary to provide pairs of signaling devices.

Another object of the invention is to so form the signaling device that when it is applied to a headlight it will be firmly mounted within the same back of the lens with the portion bearing the representation of an eye offset inwardly so that distortion will not be caused by heat when the bulbs are burning.

The invention is illustrated in the accompany drawing, wherein:

Fig. 1 is a view in elevation showing the headlights of an automobile or other motor vehicle equipped with the signaling devices.

Fig. 2 is a horizontal sectional view taken on the line 2—2 of Fig. 3, and showing the improved signal mounted within a headlight.

Fig. 3 is a vertical sectional view taken on the line 3—3 of Fig. 2.

In Fig. 1, there has been shown a portion of an automobile or other motor vehicle 1 having the usual front wheels 2 and mud guards 3 upon which are mounted headlights 4 disposed at opposite sides of the radiator 5. It is, of course, obvious that the headlights need not be mounted on the mud guards directly at opposite sides of the radiator but it is essential that they be so located that there will distinctly be a right hand headlight and a left hand headlight.

Each headlight has the usual casing 6, the front end of which is closed by a lens 7 held in place by a removable ring 8. There has also been provided the usual socket 9 in which a bulb 10 is mounted. When the bulbs of both headlights are burning, they clearly indicate to the driver of an approaching vehicle that he is going to pass an automobile, truck or the like and he can gauge the width of the vehicle to be passed by the distance between the headlights. When, however, one of the headlights is extinguished, it is often difficult to determine which headlight is out of operation and, at times, an automobile having but one headlight burning will be mistaken for a motorcycle. This causes numerous accidents by head-on collisions or one automobile sideswiping another when passing.

In order to prevent such accidents, the headlights 4 have been provided with signaling members 11 each bearing the representation of a human eye, as shown at 12, the pupils 13 being presented inwardly, as shown in Fig. 1, and clearly representing the right and left eyes of a person. Each signal consists of a main sheet 14 of Celluloid or other suitable transparent material and an auxiliary sheet 15 formed of the same type of material. The main sheet 14 is circular and of such diameter that when the rubber bordering strip or binding 16 is applied, it will fit snugly into the casing or shell 6 where it is held in close contacting engagement with the rear surface of marginal portions of the lens 7 by clips 17 which are mounted against side portions of the casing in position to engage the binding and firmly hold the signaling device in its proper position in the headlight casing. An opening 18 is formed in the central portion of the main disk or sheet 14, and upon reference to Fig. 3, it will be seen that this opening is of appreciable size and tapered to a point at its outer end so that it has the general shape of a human eye. By forming this opening, a large area of the auxiliary sheet 15 is exposed and spots 19 and 20 upon the inner sheet may be clearly seen. These spots are preferably in the form of translucent or opaque paint applied to the rear surface of the auxiliary sheet, but may be of other suitable material suitably applied to the sheet, and the arrangement of the spots is such that the spots 19 present the outline of an eye and the spots 20, which are arranged in a circle, represent the pupil of the eye. The spots may be yellow or any other color desired, which will show clearly when the headlight is in operation. The sheet 15 is offset rearwardly from the main sheet with its end portions bent forwardly and united to the main sheet, as shown at 21, the upper and lower edges of the sheet 15 being free from the main sheet so that expansion and contraction may take place without distorting the auxiliary sheet or causing buckling of the main sheet.

When the signal is in use, the two devices are fitted into the headlights after removing the lenses 7 and the lenses then replaced and secured by their retainer rings 8. In view of the fact that the opening 18 and the representation of an eye formed by the dots 19 and 20 are substantially centrally of the main disk, it is not necessary to select a particular signaling device for use in the right and left hand headlight. After inserting the signaling devices, they must be turned to properly dispose the eyes, as shown in Fig. 1, and, upon replacing the lenses and their retainer rings, the installation is completed and the signal ready for use. When the headlights are turned on, light from their bulbs 10 passes through the disks or sheets 14 and 15 without appreciable dimming but the spots 19 and 20 will show very clearly and impart the appearance of a right eye and a left eye when seen by the driver of an approaching vehicle. This is clearly illustrated in Fig. 1 of the drawing. The driver of a vehicle approaching an automobile having its headlights equipped with the improved signaling device will ordinarily see the two eyes instead of merely a pair of headlights. If the bulb of one headlight is extinguished for any reason, only one eye will be displayed and since the right eye and the left eye are readily distinguishable from each other, it can be easily determined which headlight is in operation. Therefore, the driver looking at the oncoming vehicle can accurately determine which headlight he is looking at and make proper calculation as to the amount of space he has for passing the oncoming vehicle. It will thus be seen that collisions caused by a mistake as to which headlight is not in operation will be avoided.

Having thus described the invention, what is claimed is:

1. A signal light of the character described comprising in combination, a casing, a lens for said casing, a light bulb in the casing, a disk of plastic light penetratable material such as Celluloid fitting in the casing back of said lens, said disk being formed with an opening extending transversely thereof, a strip of plastic light penetratable material such as Celluloid of greater dimensions than the opening spaced rearwardly from said disk and extending across the opening with its upper and lower edges free and its end portions directed forwardly and secured to the disk at opposite sides of the opening, and indicia upon said strip and exposed through the opening of the disk and prominently displayed by light from the bulb when the signal is in operation.

2. A signal indicia member comprising a disk of plastic light penetratable material such as Celluloid formed with an opening of appreciable size extending transversely thereof, a strip of plastic light penetratable material such as Celluloid of greater dimensions than the opening spaced rearwardly from the disk and extending across the opening in blocking relation thereto with its end portions bent forwardly and secured against the rear face of the disk and its remaining edges free from the disk, and indicia upon said strip located back of the opening and exposed therethrough.

PEDER M. KNUDSEN.